(12) United States Patent
Shan

(10) Patent No.: US 11,407,274 B2
(45) Date of Patent: Aug. 9, 2022

(54) ACCUMULATOR PRESSURE DROP REGULATION SYSTEM FOR A HEAT PUMP

(71) Applicants: DENSO International America, Inc., Southfield, MI (US); Denso Corporation, Kariya (JP)

(72) Inventor: Zhiwei Shan, Rochester, MI (US)

(73) Assignees: DENSO INTERNATIONAL AMERICA, INC, Southfield, MI (US); DENSO CORPORATION, Kariya (JP)

( * ) Notice: Subject to any disclaimer, the term of this patent is extended or adjusted under 35 U.S.C. 154(b) by 252 days.

(21) Appl. No.: 16/817,073

(22) Filed: Mar. 12, 2020

(65) Prior Publication Data

US 2021/0283976 A1    Sep. 16, 2021

(51) Int. Cl.
  *B60H 1/00*  (2006.01)
  *F25B 43/00*  (2006.01)

(52) U.S. Cl.
  CPC ......... *B60H 1/005* (2013.01); *B60H 1/00007* (2013.01); *B60H 1/00907* (2013.01); *F25B 43/006* (2013.01); *F25B 2400/23* (2013.01); *F25B 2700/193* (2013.01); *F25B 2700/197* (2013.01); *F25B 2700/1933* (2013.01)

(58) Field of Classification Search
  CPC ............... F25B 43/006; F25B 2400/23; F25B 2700/193; F25B 2700/1933; F25B 2700/197; B60H 1/005; B60H 1/00007; B60H 1/00907
  See application file for complete search history.

(56) References Cited

U.S. PATENT DOCUMENTS

| | | | | |
|---|---|---|---|---|
| 2,715,318 A | * | 8/1955 | Millman | F25B 47/025 62/81 |
| 2,983,286 A | * | 5/1961 | Greenawalt | F16K 31/40 137/625.43 |
| 3,525,234 A | * | 8/1970 | Widdowson | F25B 43/003 62/217 |
| 3,609,990 A | * | 10/1971 | Bottum | F25B 43/006 62/217 |

(Continued)

FOREIGN PATENT DOCUMENTS

JP  2000304373 A  * 11/2000
JP  2016217559 A  * 12/2016

OTHER PUBLICATIONS

Solenoid Valve Types—TAMESON (Sep. 2017) (Year: 2017).*
JP2016070555A English Machine Translation (Year: 2016).*
JP2000304373A English Machine Translation (Year: 2000).*

*Primary Examiner* — Jenna M Hopkins
(74) *Attorney, Agent, or Firm* — Brooks Kushman P.C.

(57) ABSTRACT

A refrigeration circuit for a vehicle system includes a compressor, an evaporator, an accumulator, an inlet tube, an outlet tube, and a bypass valve. The inlet tube is configured to deliver refrigerant from the evaporator to the accumulator. The outlet tube is configured to deliver refrigerant from the accumulator to the compressor. The bypass valve is in fluid communication with the inlet and outlet tubes. The bypass valve has an open position and a closed position. The bypass valve is configured to direct refrigerant flow from the inlet tube to the outlet tube to bypass the accumulator when in the open position. The bypass valve is configured to restrict refrigerant from flowing from the inlet tube to the outlet tube when in the closed position.

17 Claims, 3 Drawing Sheets

(56) References Cited

U.S. PATENT DOCUMENTS

| | | | | |
|---|---|---|---|---|
| 3,651,657 A * | 3/1972 | Bottum | F25B 43/006 | 62/196.3 |
| 3,938,351 A * | 2/1976 | Schumacher | F25B 43/00 | 62/217 |
| 3,955,375 A * | 5/1976 | Schumacher | F25B 43/006 | 62/217 |
| 4,100,762 A * | 7/1978 | Davis | F28D 7/024 | 62/160 |
| 4,331,001 A * | 5/1982 | Jones | F25B 43/006 | 62/474 |
| 4,509,340 A * | 4/1985 | Mullally | F25B 43/006 | 210/DIG. 6 |
| 4,757,696 A * | 7/1988 | Gannaway | F25B 43/006 | 62/503 |
| 4,800,737 A * | 1/1989 | Smith | F25B 41/22 | 62/503 |
| 4,815,298 A * | 3/1989 | Van Steenburgh, Jr. | F25B 41/20 | 62/196.4 |
| 5,425,249 A * | 6/1995 | Lyman | B60H 1/3225 | 62/471 |
| 5,531,077 A * | 7/1996 | Formenti | B60H 1/3225 | 62/197 |
| 5,687,578 A * | 11/1997 | Cochran | F25B 41/315 | 62/113 |
| 5,799,499 A * | 9/1998 | Yano | F25B 41/31 | 62/225 |
| 6,112,718 A | 9/2000 | Bond | | |
| 6,220,041 B1 * | 4/2001 | Okazaki | F25B 25/00 | 62/119 |
| 6,389,842 B1 * | 5/2002 | Telesz | F04B 39/0055 | 62/503 |
| 6,418,751 B1 * | 7/2002 | Telesz | F25B 43/006 | 62/471 |
| 6,606,879 B1 * | 8/2003 | Telesz | F25B 13/00 | 62/324.6 |
| 6,701,731 B2 * | 3/2004 | Aikawa | F25B 5/04 | 62/225 |
| 7,086,238 B2 * | 8/2006 | Stein | B60H 1/00585 | 62/149 |
| 7,207,186 B2 * | 4/2007 | Hirota | F04F 5/04 | 62/228.3 |
| 9,233,594 B2 * | 1/2016 | Arai | B60H 1/00392 | |
| 9,261,298 B2 * | 2/2016 | Wang | F25B 43/00 | |
| 9,285,147 B1 * | 3/2016 | Quesada Saborio | F25B 41/40 | |
| 10,119,724 B2 * | 11/2018 | Jonsson | F24H 9/14 | |
| 10,989,457 B2 * | 4/2021 | Hosokawa | F25B 43/00 | |
| 2008/0016887 A1 * | 1/2008 | Locke | F25B 43/006 | 62/117 |
| 2010/0236283 A1 * | 9/2010 | Ballet | F25B 13/00 | 62/513 |
| 2013/0333402 A1 * | 12/2013 | Styles | B60H 1/3204 | 62/89 |
| 2014/0075981 A1 * | 3/2014 | Uchida | B60H 1/3213 | 62/498 |
| 2017/0336116 A1 | 11/2017 | Fukui et al. | | |
| 2019/0299126 A1 * | 10/2019 | Osaki | B01D 19/0005 | |
| 2020/0063736 A1 * | 2/2020 | Nakai | F04C 18/0215 | |
| 2021/0283976 A1 * | 9/2021 | Shan | F25B 43/006 | |

* cited by examiner

ACCUMULATOR PRESSURE DROP REGULATION SYSTEM FOR A HEAT PUMP

TECHNICAL FIELD

The present disclosure relates to heat pumps and refrigeration systems that may be utilized in vehicles.

BACKGROUND

Vehicles may include heat pumps or refrigeration systems that are configured to heat or cool various vehicles subcomponents or subsystems.

SUMMARY

A heat pump for a vehicle system includes a refrigeration circuit, a bypass channel, and a valve. The refrigeration circuit has a compressor, an evaporator, and an accumulator. The accumulator is in fluid communication with an inlet tube that is configured to deliver refrigerant from the evaporator to the accumulator. The accumulator is also in fluid communication with an outlet tube that is configured to deliver refrigerant from the accumulator to the compressor. The bypass channel is in fluid communication with the inlet tube and the outlet tube. The bypass channel is configured to bypass the accumulator via directing refrigerant from the inlet tube to the outlet tube. The valve is disposed within the bypass channel. The valve includes an, open position and a closed position. The valve is configured to allow refrigerant to flow through the bypass channel when in the open position. The valve is configured to restrict refrigerant from flowing through the bypass channel when in the closed position.

A refrigeration circuit for a vehicle system includes a compressor, an evaporator, an accumulator, an inlet tube, an outlet tube, and a bypass valve. The inlet tube is configured to deliver refrigerant from the evaporator to the accumulator. The outlet tube is configured to deliver refrigerant from the accumulator to the compressor. The bypass valve is in fluid communication with the inlet and outlet tubes. The bypass valve has an open position and a closed position. The bypass valve is configured to direct refrigerant flow from the inlet tube to the outlet tube to bypass the accumulator when in the open position. The bypass valve is configured to restrict refrigerant from flowing from the inlet tube to the outlet tube when in the closed position.

An accumulator system for a for heat pump includes an exterior housing, an inlet, an outlet, a bypass, and a valve. The exterior housing defines an internal cavity. The inlet extends through the exterior housing and into the internal cavity. The inlet is configured to deliver refrigerant to the cavity. The outlet extends through the exterior housing and into the internal cavity. The outlet is configured to transport refrigerant away from the cavity. The bypass is in fluid communication with the inlet and the outlet. The bypass is configured to bypass the cavity via directing refrigerant from the inlet to the outlet. The valve is disposed within the bypass. The valve has an open position and a closed position. The valve is configured to allow refrigerant to flow through the bypass when in the open position. The valve is configured to restrict refrigerant from flowing through the bypass when in the closed position.

DETAILED DESCRIPTION

Embodiments of the present disclosure are described herein, it is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
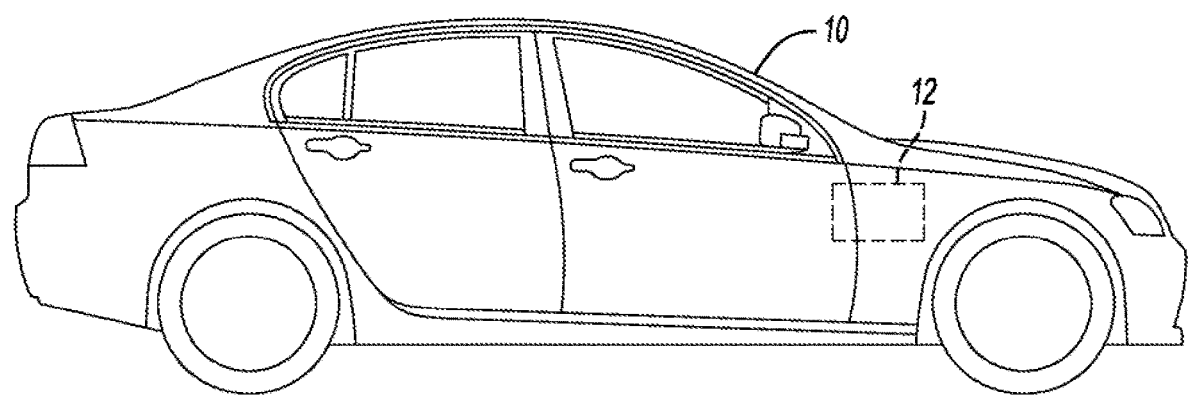
FIG. 1 is a schematic representation of a vehicle having a heat pump.

Referring to FIG. 1, a vehicle 10 having a heat pump 12 is illustrated. The heat pump 12 may be part of the heating, ventilation, and air conditioning (HVAC) system (e.g., the heat pump may be utilized to heat, cool, dry, condition, etc. air that is being introduce into a cabin area of the vehicle 10), or may be part of another vehicle subsystem that may require heating or cooling. For example, the heat pump 12 may be utilized to cool a liquid coolant that is in turn configured to cool another vehicle subcomponent, such as a battery (particularly if the vehicle 10 is a hybrid or electric vehicle and the battery provides electrical power to propel the vehicle 10). However, it should be understood that the heat pump 12 may be utilized to heat or cool any vehicle subcomponent or subcomponents, either directly or through another medium such as a liquid coolant.

Figure 2:
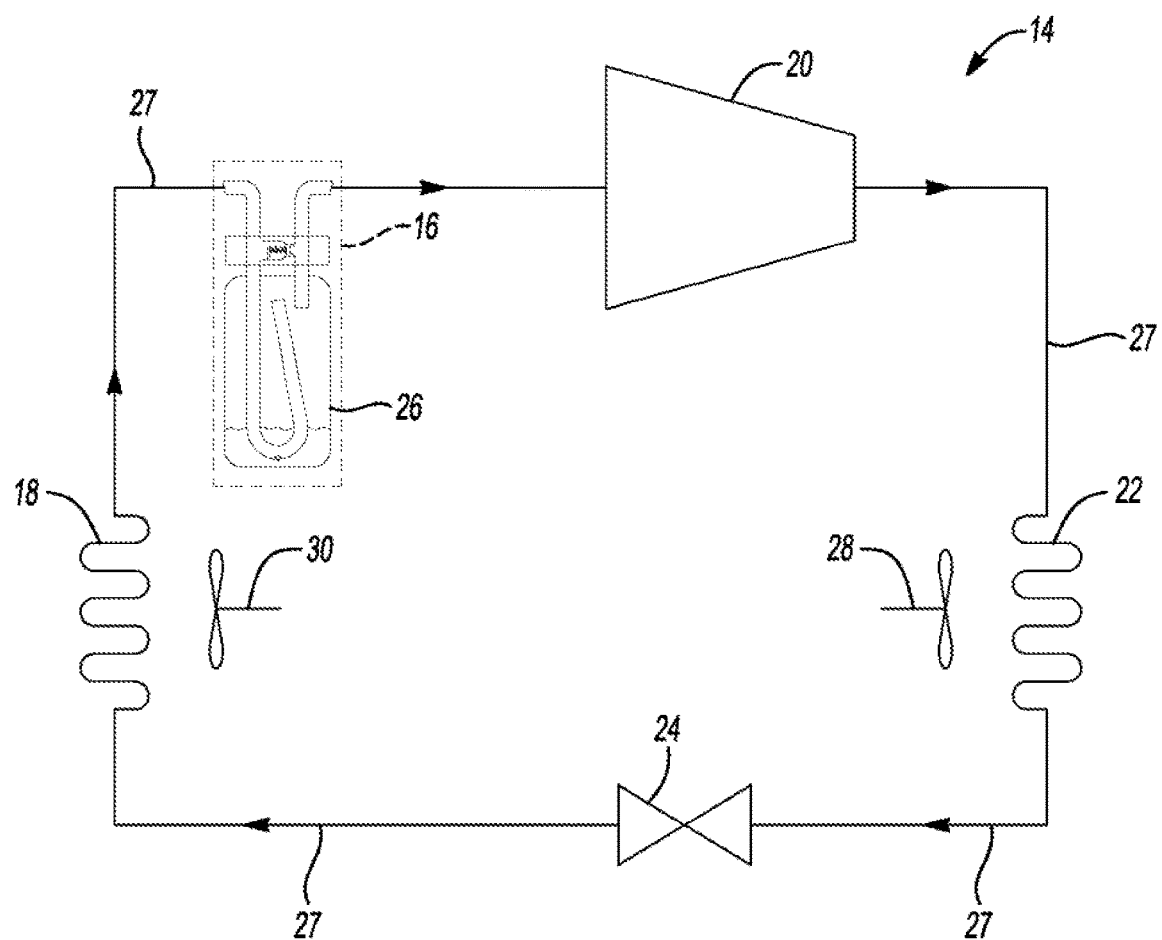
FIG. 2 is a diagram illustrating a refrigerant circuit of the heat pump that includes an accumulator system having an accumulator bypass.

Referring to FIG. 2, a diagram illustrating a refrigeration circuit 14 of the heat pump 12 that includes an accumulator system 16 having an accumulator bypass is illustrated. The refrigeration circuit 14 of the heat pump 12 may include an evaporator 18, a compressor 20, a condenser 22, a thermal expansion valve 24, and an accumulator 26. The refrigeration circuit 14 includes lines or tubes 27 that are configured to transport the refrigerant between the evaporator 18, compressor 20, condenser 22, thermal expansion valve 24, and accumulator 26. The refrigerant within the refrigeration circuit 14 is converted from a low-pressure gaseous form to a high-pressure gaseous form within the compressor 20. The refrigerant is directed from the compressor 20 to the condenser 22. Heat may be transferred from the refrigerant to an external medium. A fan 28 may be configured to direct air across the condenser 22 to transfer heat to the external medium. The external medium that is being heated by the condenser 22 may be air that is being heated and directed into the cabin of the vehicle; the ambient air surrounding the vehicle; any subcomponent of the vehicle; a liquid (e.g., glycol), which is in turn being utilized to heat a subcomponent of the vehicle; a hot plate that is being utilized to heat a subcomponent of the vehicle or a liquid, which is in turn being utilized to heat a subcomponent of the vehicle; etc.

The refrigerant then flows from the condenser 22 to the thermal expansion valve 24 where the pressure of the liquid refrigerant is reduced to allow the liquid refrigerant to expand, which decreases the temperature of the liquid refrigerant. The liquid refrigerant is then directed to the evaporator 18 where the refrigerant changes state from a liquid to a gas, which requires heat. The evaporator 18 transfers heat from an external source to the refrigerant. A fan 30 may be configured to direct air across the evaporator 18 to transfer heat from the external source to the refrigerant. The external source of heat that the evaporator 18 draws heat from may be air that is being cooled and directed into the cabin of the vehicle; the ambient air surrounding the vehicle; any subcomponent of the vehicle; a liquid coolant (e.g., glycol), which is in turn being utilized to cool a subcomponent of the vehicle, such as a battery; a chiller or chiller plate that is being utilized to cool a subcomponent of the vehicle, such as a battery, or a liquid coolant, which is in turn being utilized to cool a subcomponent of the vehicle; etc.

The refrigerant then flows from the evaporator 18 to the accumulator 26, and from the accumulator 26 back to the compressor 20. More, specifically, the accumulator 26 is located on a line or tube 27 of the refrigeration circuit 14 that is between the evaporator 18 and the compressor 20, which may be referred to as the suction line. The accumulator 26 prevents liquid refrigerant that did not evaporate in the evaporator 18 from flowing into the compressor 20. Liquid refrigerant is known to cause damage to compressors in refrigeration circuits, since the compressors are typically designed to compress a gaseous refrigerant and not a liquid refrigerant. Such a condition where liquid refrigerant enters a compressor is known as a "liquid hammer" or liquid slugging. The liquid refrigerant may also wash lubrication oil out of the compressor, which may cause damage to the moving parts within the compressor due to the lack of lubrication between the moving parts. An accumulator is utilized to prevent liquid refrigerant from flowing into the compressor in order prevent damage that may be caused to the compressor when the liquid refrigerant flows into the compressor.

The compressor 20, fan 28, fan 30, and any other component may be powered by an electrical power source (not show), such as a battery, and may be controlled by a controller (not shown). More specifically, the compressor 20, fan 28, fan 30, and any other component may be operated by an electrical actuator, such an electric motor, which may be powered by an electrical power source and may be controlled by a controller. The controller may be configured to automatically operate the compressor 20, fan 28, fan 30, or any other component based on an algorithm when specific conditions are present. Alternatively or in addition to automatic operation, the controller may be configured to operate the compressor 20, fan 28, fan 30, or any other component based on input from a vehicle operator (e.g., a vehicle operator using a control panel to initiate heating or cooling air that is being introduced into the vehicle cabin).

The controller may be part of a larger control system and may be controlled by various other controllers throughout the vehicle 10, such as a vehicle system controller (VSC). It should therefore be understood that the controller and one or more other controllers can collectively be referred to as a "controller" that controls various actuators in response to signals from various sensors or inputs to control various functions of the vehicle 10. The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 10.

A pressure drop in the suction line of a refrigeration system (e.g., the line or tube 27 between the evaporator 18 and the compressor 20) may reduce the capacity of the system to transfer heat and may also reduce the efficiency of the system. An accumulator disposed on the suction line may cause such a pressure drop. When a refrigerant flow rate of refrigerant through a refrigeration circuit of a heat pump increases, the pressure drop across the suction line, and particularly the pressure drop across the accumulator that is disposed on the suction line, also increases. In order to reduce the pressure drop across the accumulator, this disclosure proposes to utilize an accumulator bypass or bypass system that allows for some or all of the refrigerant to bypass the accumulator, which in turn decreases the pressure drop across the suction line and particularly decreases the pressure drop across the accumulator. The accumulator bypass system may be designed to bypass the accumulator only under specific conditions so that the accumulator may still perform the function of preventing liquid refrigerant from flowing to the compressor. For example, the accumulator bypass system may be designed to bypass the accumulator under conditions where the pressure drop across the suction line and the pressure drop across the accumulator (which correspond with an increase in a refrigerant flow rate) has increased to undesirable levels that result in a reduced the capacity of the system to transfer heat and a reduced efficiency of the system.

Figure 3:
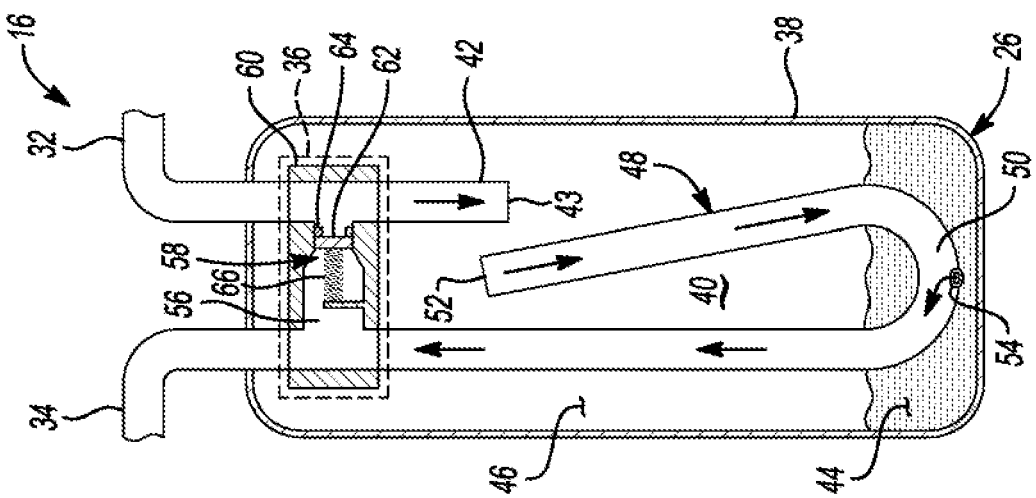
FIG. 3 is a front view of the accumulator system illustrating a valve of the accumulator bypass in a closed position.
Figure 4:
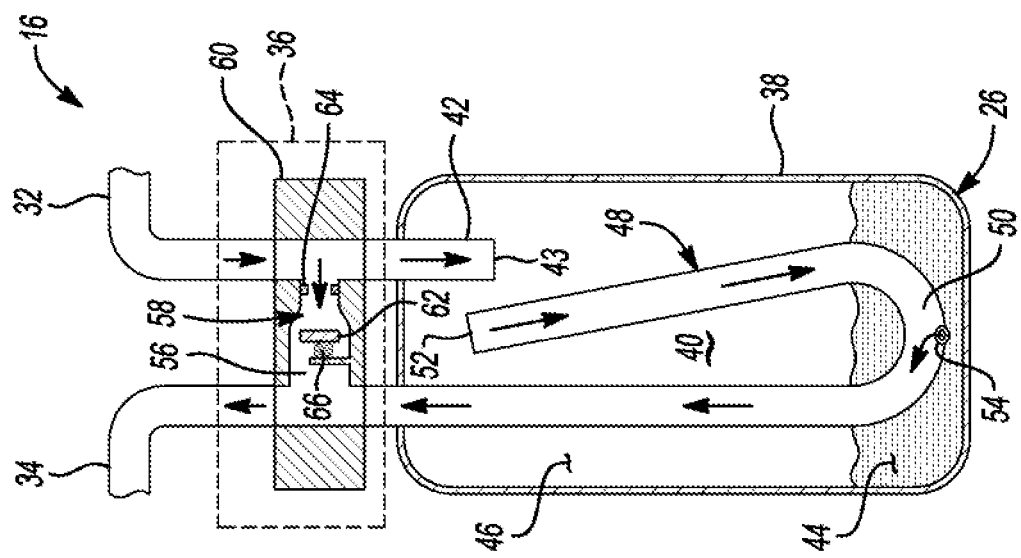
FIG. 4 is a front view of the accumulator system illustrating a valve of the accumulator bypass in an open position.

Referring to FIGS. 3 and 4, the accumulator system 16 is illustrated in further detail. The accumulator system 16 includes the accumulator 26 itself, an inlet tube 32, an outlet tube 34, and an accumulator bypass system 36. The inlet tube 32 and the outlet tube 34 are both portions of the suction line that is disposed between the evaporator 18 the compressor 20. The accumulator 26 is in fluid communication with the inlet tube 32 and the outlet tube 34. The inlet tube 32 is configured to deliver refrigerant from the evaporator 18 to the accumulator 26. The outlet tube 34 and is configured to deliver refrigerant from the accumulator 26 to the compressor 20.

The accumulator 26 includes an exterior housing 38 that defines an internal cavity 40. The front face of the exterior housing 38 has been cut away in FIGS. 3-5 so that the internal components of the accumulator 26 may be observed. However, it should be understood that the exterior housing 38 is a closed vessel that is only accessible through the inlet and outlet conduits 42, 48 that are described in further detail below. The inlet conduit 42 extends through the exterior housing 38 and into the internal cavity 40. The inlet conduit 42 is configured to deliver refrigerant from the evaporator 18 to the internal cavity 40. The inlet conduit 42 may be part of and an extension of the inlet tube 32. The inlet conduit terminates and has an opening 43 that is near the top of the internal cavity 40. After the refrigerant enters the internal cavity 40, the refrigerant is separated such that a liquid portion 44 of the refrigerant gathers along the bottom of the cavity 40 and a gaseous portion 46 of the refrigeration gathers along the top of the internal cavity 40.

The outlet conduit 48 also extends through the exterior housing 38 and into the internal cavity 40. The outlet conduit 48 is configured transport refrigerant away from internal cavity 40 and toward the compressor 20, The outlet conduit 48 may be part of and an extension of the outlet tube 34. The outlet conduit 48 extends downward and toward the bottom of the internal cavity 40. Along the bottom of the internal cavity 40, the outlet conduit 48 forms a bend 50. The outlet conduit 48 then extends upward from the bend 50 toward the top of the cavity 40, The outlet conduit 48 then terminates and has an opening 52 that is near the top of the internal cavity 40. The opening 52 of the outlet conduit 48 is positioned near the top of the internal cavity 40 such that the gaseous portion. 46 of the refrigerant is pulled into the outlet conduit 48 and then delivered to the compressor 20.

A small orifice may be defined along the bottom of the outlet conduit 48. The small orifice may be referred to as the oil return hole 54, The oil return hole 54 allows a small amount of oil that may have gathered along the bottom of the internal cavity 40 and a small amount of the liquid refrigerant 44 to flow back to the compressor 20 from the accumulator 26 via the outlet conduit 48 and outlet tube 34. The oil that may have gathered in the accumulator 26 is utilized to lubricate the moving components of the compressor 20. Therefore, the oil return hole 54 allows the oil to be returned to the compressor 20 in order to prevent damage that may occur to the compressor 20 due to a lack of lubrication. Also, the oil return hole 54 is sized such that the small amount of liquid refrigerant 44 that flows through the oil return hole 54 will be vaporized (i.e., transformed into a mist) which prevents the liquid refrigerant from causing a "liquid hammer" condition within the compressor 20. Furthermore, the liquid refrigerant will also likely boil off (i.e., transition from a liquid mist to a gas) in the suction line before reaching the compressor 20 and return to the compressor 20 in a gaseous form, which eliminates the possibility of a "liquid hammer" condition occurring within the compressor 20.

The accumulator bypass system 36 includes a bypass channel 56 that is in fluid communication with the inlet tube 32 and the outlet tube 34. The bypass channel 56 is configured to bypass the accumulator 26, or more specifically the internal cavity 40 of the accumulator 26, via directing the refrigerant directly from the inlet tube 32 to the outlet tube 34. The accumulator bypass system 36 includes a bypass valve 58 that is disposed within the bypass channel 56. The bypass valve 58 includes an open position, which is illustrated in FIG. 4, and a closed position, which is illustrated in FIG. 3. The bypass valve 58 is configured to allow refrigerant to flow through the bypass channel 56 when in the open position. The bypass valve 58 is configured to restrict refrigerant from flowing through the bypass channel 56 when in the closed position. Restricting refrigerant flow may refer to a reduction in flow of refrigerant through the bypass channel 56 when the bypass valve 58 is in a partially closed position (e.g., where the valve plug 62 is in-between the positions depicted in FIGS. 3 and 4) or when the bypass valve 58 is in a completely closed position (i.e., the position depicted in FIG. 3) that prevents any refrigerant from flowing through the bypass channel 56. The accumulator bypass system 36 may more specifically includes a valve housing 60 that defines the bypass channel 56. A valve plug 62 may engage and disengage a valve seat 64 that partially defines the bypass channel 56 to transition the bypass valve 58 between the open position and the closed position, respectively. The front face of the valve housing 60 has been cut away in FIGS. 3-5 so that the internal components may be observed.

The bypass channel 56, valve housing 60, valve plug 62, valve seat 64, and a spring 66 may collectively be referred to as the bypass valve 58. When the bypass channel 56, valve housing 60, valve plug 62, valve seat 64, and spring 66 are collectively referred to as the bypass valve 58, it may be stated that the bypass valve 58 is in fluid communication with the inlet and outlet tubes 32, 34, that the bypass valve 58 has an open position (see FIG. 4) and a closed position (see FIG. 3), that the bypass valve 58 is configured to direct refrigerant flow from the inlet tube 32 to the outlet tube 34 to bypass the accumulator 26 when the bypass valve 58 is in the open position, and that the bypass valve 58 is configured to restrict refrigerant from flowing, directly from the inlet tube 32 to the outlet tube 34 when in the closed position.

The valve 58 is configured to transition from the closed position to the open position in response to a pressure differential between the inlet tube 32 and the outlet tube 34 increasing to greater than a threshold. The increase in the pressure differential between the inlet tube 32 and the outlet tube 34 that results in the valve 58 opening corresponds to an increase in a refrigerant flow rate through the suction line (which includes both the inlet tube 32 and the outlet tube 34) and a corresponding increase in the pressure drop in the suction line and/or across the accumulator 26. Such an increase in the refrigerant flow rate through the suction line and the corresponding increase in the pressure drop in the suction line and/or across the accumulator 26 results in a decrease in the heat transfer capacity of the heat pump 12 and a decrease in the efficiency of the heat pump 12. Opening the bypass valve 58 under such conditions reduces the pressure drop in the suction line, which in turn prevents or reduces a decrease in the heat transfer capacity and a decrease in the efficiency of the heat pump 12.

The bypass valve 58 is configured to transition from the open position to the closed position in response to the pressure differential between the inlet tube 32 and the outlet tube 34 decreasing to less than the threshold. The threshold utilized to transition the valve 58 from the open position to the closed position may be the same as the threshold utilized to transition the valve 58 from the closed position to the open position. Alternatively, the threshold utilized to transition the valve 58 from the open position to the closed position may be slightly different than the threshold utilized to transition the valve 58 from the closed position to the open position to allow a hysteresis within the system. The decrease in the pressure differential between the inlet tube 32 and the outlet tube 34 that results in the valve 58 closing corresponds to a decrease in a refrigerant flow rate through the suction line and a corresponding decrease in the pressure drop in the suction line and/or across the accumulator 26 that is sufficiently low enough that the heat transfer capacity and/or the efficiency of the heat pump 12 are not significantly affected (i.e., there is no decrease or a only slight decrease in the heat transfer capacity and/or the efficiency of the heat pump 12). Under such conditions, it may be desirable to close the valve 58 to increase the functional output of the accumulator 26 since the benefit of opening the bypass valve 58 (i.e., preventing the decrease in heat transfer capacity and efficiently of the heat pump 12) is no longer present.

The bypass valve 58 may include a spring 66 that biases the bypass valve 58 into the closed position depicted in FIG. 4. More specifically, the spring 66 may bias the valve plug 62 into contact with the valve seat 64 such that refrigerant is restricted or prevented from flowing through the bypass channel 56. The spring 66 may be pre-loaded such that the spring 66 is configured to bias the valve 58 into the closed position depicted in FIG. 3 in response to the pressure differential between the inlet tube 32 and the outlet tube 34 being less than a threshold. The spring 66 may also be configured to compress and transition the valve 58 into the open position depicted in FIG. 4 or a partially opened position (e.g., where the valve 62 plug is longer in contact with the valve seat and is positioned in between the positions depicted in FIGS. 3 and 4) in response to a pressure differential between the inlet tube 32 and the outlet tube 34 increasing to greater than a threshold. The thresholds described that allow for compression of the spring 66 correspond to the thresholds described above that transition the bypass valve 58 between the open and closed positions.

Figure 5:
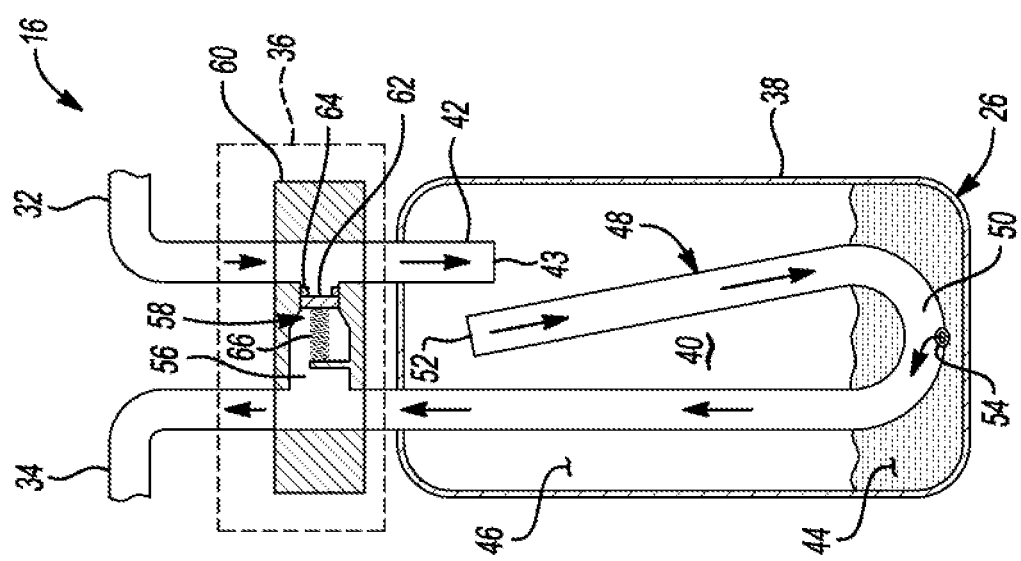
FIG. 5 is an alternative embodiment of the accumulator having the accumulator bypass.

The accumulator bypass system 36, or more specifically, bypass valve 58 as a whole (i.e., the bypass channel 56, valve housing 60, valve plug 62, valve seat 64, and spring 66) may be connected to the inlet tube 32 and outlet 34 external of the exterior housing 38 of the accumulator 26, as depicted in FIGS. 3 and 4. Alternatively, the bypass system 36, or more specifically the bypass valve 58 as a whole (i.e., the bypass channel 56, valve housing 60, valve plug 62, valve seat 64, and spring 66) may be connected to the inlet tube 32 and outlet tube 34 within the internal cavity 40 defined by the exterior housing 38 of the accumulator 26, as depicted in FIG. 5.

Figure 6:
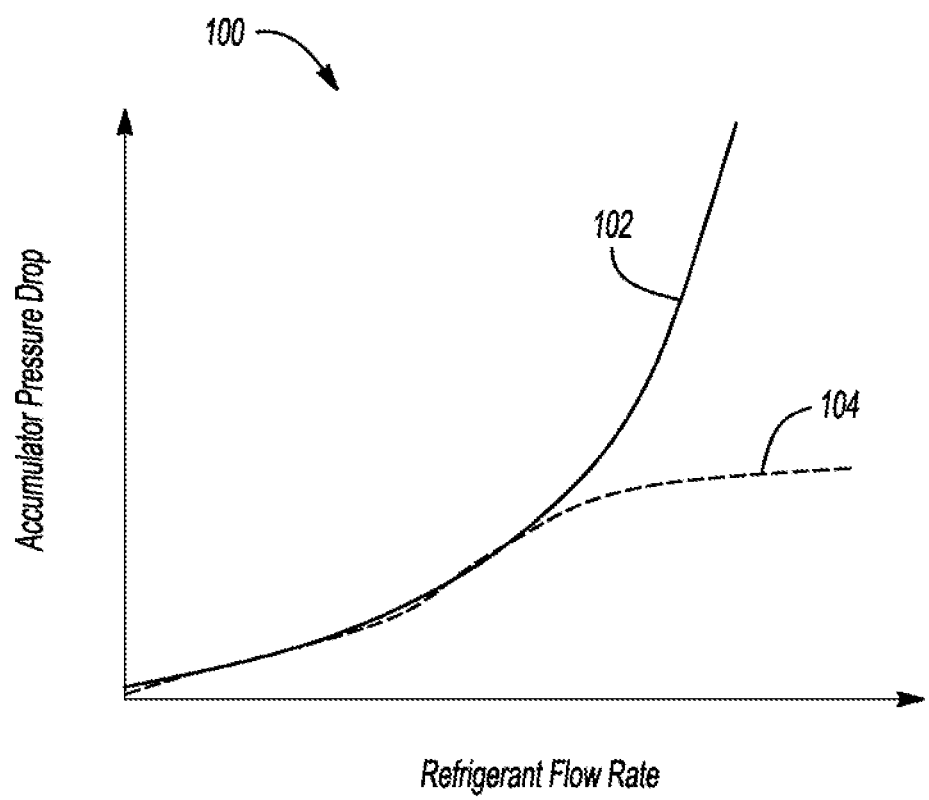
FIG. 6 is a graph illustrating the decrease in pressure drop that occurs across the accumulator at higher refrigerant flow rates in a refrigeration system that includes the accumulator bypass relative to the pressure drop that occurs across the accumulator at higher refrigerant flow rates in a refrigeration system that does not include the accumulator bypass.

Referring to FIG. 6, a graph 100 of the pressure drop that occurs across an accumulator of a refrigeration system that includes the accumulator bypass system 36 relative to the pressure drop that occurs across an accumulator of a refrigeration system that does not include the accumulator bypass system 36 is illustrated. Line 102 illustrates the pressure drop of a refrigerant across the accumulator of refrigeration system that does not include the accumulator bypass system 36 relative to the refrigerant flow rate within the system. Line 104 illustrates the pressure drop of a refrigerant across the accumulator of refrigeration system that does include the accumulator bypass system 36 relative to the refrigerant flow rate within the system. The graph 100 illustrates that at higher refrigerant flow rates within the systems, the pressure drop of the system that includes the accumulator bypass system 36 is much less than the pressure drop of the system that does not include the accumulator bypass system 36, which results in a higher heat transfer capacity and efficiency in the system that includes the accumulator bypass system 36.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A heat pump for a vehicle system comprising:
 a refrigeration circuit having a compressor, an evaporator, and an accumulator, wherein the accumulator is in fluid communication with an inlet tube that is configured to deliver refrigerant from the evaporator to the accumulator and is in fluid communication with an outlet tube that is configured to deliver refrigerant from the accumulator to the compressor;
 a bypass channel in fluid communication with the inlet tube and the outlet tube, wherein the bypass channel is configured to bypass the accumulator via directing refrigerant from the inlet tube to the outlet tube; and
 a valve disposed within the bypass channel and including an open position and a closed position, wherein the valve is configured to allow refrigerant to flow through the bypass channel when in the open position and to restrict refrigerant from flowing through the bypass channel when in the closed position, wherein the valve is configured to transition from the closed position to the open position in response to a pressure differential between the inlet tube and the outlet tube increasing to greater than a threshold.

2. The heat pump for the vehicle system of claim 1, wherein the valve is configured to transition from the open position to the closed position in response to a pressure differential between the inlet tube and the outlet tube decreasing to less than a threshold.

3. The heat pump for the vehicle system of claim 1 further comprising a spring that biases the valve into the closed position.

4. The heat pump for the vehicle system of claim 3, wherein the spring is configured to bias the valve into the closed position in response to a pressure differential between the inlet tube and the outlet tube being less than a threshold.

5. The heat pump for the vehicle system of claim 3, wherein the spring is configured to compress and transition the valve into the open position in response to a pressure differential between the inlet tube and the outlet tube increasing to greater than a threshold.

6. The heat pump for the vehicle system of claim 1, wherein the accumulator includes an exterior housing that defines an internal cavity, the inlet and outlet tubes extend through the exterior housing and into the internal cavity, and the bypass channel is connected to the inlet and outlet tubes external of the exterior housing.

7. The heat pump for the vehicle system of claim 1, wherein the accumulator includes an exterior housing that defines an internal cavity, the inlet and outlet tubes extend through the exterior housing and into the internal cavity, and the bypass channel is connected to the inlet and outlet tubes within the cavity.

8. A refrigeration circuit for a vehicle system comprising:
a compressor;
an evaporator;
an accumulator;
an inlet tube configured to deliver refrigerant from the evaporator to the accumulator;
an outlet tube configured to deliver refrigerant from the accumulator to the compressor; and
a bypass valve in fluid communication with the inlet and outlet tubes and having an open position and a closed position, wherein the bypass valve is configured to direct refrigerant flow from the inlet tube to the outlet tube to bypass the accumulator when in the open position and to restrict refrigerant from flowing from the inlet tube to the outlet tube when in the closed position, wherein the bypass valve is configured to transition from the closed position to the open position in response to a pressure differential between the inlet tube and the outlet tube increasing to greater than a threshold.

9. The refrigeration circuit for the vehicle system of claim 8, wherein the bypass valve is configured to transition from the open position to the closed position in response to a pressure differential between the inlet tube and the outlet tube decreasing to less than a threshold.

10. The refrigeration circuit for the vehicle system of claim 8 further comprising a spring that biases the bypass valve into the closed position.

11. The refrigeration circuit for the vehicle system of claim 10, wherein the spring is configured to bias the bypass valve into the closed position in response to a pressure differential between the inlet tube and the outlet tube being less than a threshold.

12. The refrigeration circuit for the vehicle system of claim 10, wherein the spring is configured to compress and transition the bypass valve into the open position in response to a pressure differential between the inlet tube and the outlet tube increasing to greater than a threshold.

13. The refrigeration circuit for the vehicle system of claim 8, wherein the accumulator includes an exterior housing that defines an internal cavity, the inlet and outlet tubes extend through the exterior housing and into the internal cavity, and the bypass valve is connected to the inlet and outlet tubes external of the exterior housing.

14. The refrigeration circuit for the vehicle system of claim 8, wherein the accumulator includes an exterior housing that defines an internal cavity, the inlet and outlet tubes extend through the exterior housing and into the internal cavity, and the bypass valve is connected to the inlet and outlet tubes within the internal cavity.

15. An accumulator system for a heat pump comprising:
an exterior housing that defines an internal cavity;
an inlet extending through the exterior housing and into the internal cavity and configured to deliver refrigerant to the internal cavity;
an outlet extending through the exterior housing and into the internal cavity and configured to transport refrigerant away from the internal cavity;
a bypass in fluid communication with the inlet and the outlet, wherein the bypass is configured to bypass the internal cavity via directing refrigerant from the inlet to the outlet; and
a valve disposed within the bypass and having an open position and a closed position, wherein the valve is configured to allow refrigerant to flow through the bypass when in the open position and to restrict refrigerant from flowing through the bypass when in the closed position position, wherein the valve is configured to transition from the open position to the closed position in response to a pressure differential between the inlet and the outlet decreasing to less than a threshold.

16. The accumulator system of claim 15, wherein the valve is configured to transition from the closed position to the open position in response to a pressure differential between the inlet and the outlet increasing to greater than a threshold.

17. The accumulator system of claim 15, further comprising a spring that biases the valve into the closed position.

\* \* \* \* \*